(12) United States Patent
Graziosi

(10) Patent No.: US 11,010,955 B2
(45) Date of Patent: May 18, 2021

(54) POINT CLOUD MAPPING

(71) Applicant: SONY CORPORATION, Tokyo (JP)

(72) Inventor: Danillo Graziosi, San Jose, CA (US)

(73) Assignee: Sony Group Corporation, Tokyo (JP)

( * ) Notice: Subject to any disclaimer, the term of this patent is extended or adjusted under 35 U.S.C. 154(b) by 46 days.

(21) Appl. No.: 16/234,164

(22) Filed: Dec. 27, 2018

(65) Prior Publication Data

US 2020/0005518 A1 Jan. 2, 2020

Related U.S. Application Data

(60) Provisional application No. 62/775,248, filed on Dec. 4, 2018, provisional application No. 62/690,414, filed on Jun. 27, 2018.

(51) Int. Cl.
*G06T 15/04* (2011.01)

(52) U.S. Cl.
CPC .................. *G06T 15/04* (2013.01)

(58) Field of Classification Search
CPC ................................... G06T 15/04
USPC .................................. 345/426
See application file for complete search history.

(56) References Cited

U.S. PATENT DOCUMENTS

| 9,565,449 | B2 | 2/2017 | Chen et al. | |
|---|---|---|---|---|
| 2003/0206165 | A1* | 11/2003 | Hoppe | G06T 17/20 345/420 |
| 2013/0135298 | A1* | 5/2013 | Isogai | G06T 15/04 345/419 |
| 2013/0141435 | A1* | 6/2013 | Cho | H04N 13/302 345/426 |
| 2019/0005711 | A1* | 1/2019 | Marin | H04N 13/133 |
| 2019/0122393 | A1* | 4/2019 | Sinharoy | G06T 7/73 |

FOREIGN PATENT DOCUMENTS

WO 96/36011 A1 11/1996

OTHER PUBLICATIONS

Ruhnke, "Hierarchical Sparse Coded Surface Models", 2014 IEEE International Conference on Robotics & Automation (ICRA) Hong Kong Convention and Exhibition Center, May 31-Jun. 7, 2014, Hong Kong, China, pp. 6238-6243, (Publication Year 2014).*
Khaled Mammou,"Video-based and Hierarchical Approaches Point Cloud Compression", ISO/IEC JTC1/SC29/WG11m41649, Oct. 2017, Macau, China.

* cited by examiner

*Primary Examiner* — Hai Tao Sun
(74) *Attorney, Agent, or Firm* — Haverstock & Owens LLP

(57) ABSTRACT

Methods for mapping 3D point cloud data into 2D surfaces are described herein. The methods utilize 3D surface patches to represent point clouds and perform flexible mapping of 3D patch surface data into 2D canvas images. Patches representing geometry and patches representing attributes such as textures are placed in different canvases, where the placement of each patch is done independently for geometry and texture, that is, geometry and texture patches do not need to be co-located, as in conventional point cloud mapping. Furthermore, methods include transformations of the 3D patch when placing it into the 2D canvas, for more efficient packing.

21 Claims, 10 Drawing Sheets

POINT CLOUD MAPPING

CROSS-REFERENCE TO RELATED APPLICATION(S)

This application claims priority under 35 U.S.C. § 119(e) of the U.S. Provisional Patent Application Ser. No. 62/690,414, filed Jun. 27, 2018 and titled, "POINT CLOUD MAPPING," and the U.S. Provisional Patent Application Ser. No. 62/775,248, filed Dec. 4, 2018 and titled "POINT CLOUD MAPPING," which are both hereby incorporated by reference in their entirety for all purposes.

FIELD OF THE INVENTION

The present invention relates to three dimensional graphics. More specifically, the present invention relates to mapping of three dimensional graphics.

BACKGROUND OF THE INVENTION

Recently, point clouds have been considered as a candidate format for transmission of 3D data, either captured by 3D scanners, LIDAR sensors, or used in popular applications such as Virtual Reality/Augmented Reality (VR/AR). Point Clouds are a set of points in 3D space. Besides the spatial position (X, Y, Z), each point usually has associated attributes, such as color (R, G, B) or even reflectance and temporal timestamps (e.g., in LIDAR images). In order to obtain a high fidelity representation of the target 3D objects, devices capture point clouds in the order of thousands or even millions of points. Moreover, for dynamic 3D scenes used in VR/AR applications, every single frame often has a unique dense point cloud, which results in the transmission of several millions of point clouds per second. For a viable transmission of such large amount of data, compression is often applied.

In 2017, MPEG had issued a call for proposal (CfP) for compression of point clouds. After evaluation of several proposals, currently MPEG is considering two different technologies for point cloud compression: 3D native coding technology (based on octree and similar coding methods), or 3D to 2D projection, followed by traditional video coding. In the case of dynamic 3D scenes, MPEG is using a test model software (TMC2) based on patch surface modeling, projection of patches from 3D to 2D image, and coding the 2D image with video encoders such as HEVC. This method has proven to be more efficient than native 3D coding, and is able to achieve competitive bitrates at acceptable quality.

When coding point clouds, TMC2 classifies the points according to the direction of their normal, and groups connected components with similar classification. This results in patches of surface that are then projected onto a 2D axis-aligned plane, whose orientation depends on the classification of the points in the patch. The projections of the patch surface serve two purposes: to represent the position of the points in 3D space by recording the distance of the point to the projection plane and their respective color values. Each 2D projected patch is placed in a 2D canvas image, resulting in a sequence with depth images, and another with texture values (RGB) The projected data does not cover all the pixels in the 2D image. For those positions, a dilation operation will fill in the missing positions. For the transmission of patch information, two sequences are formed from the 2D canvas images: a depth sequence, and a texture sequence. In the case of depth sequence, the depth images are packed into the luminance (Y) channel of a video stream, while for the texture, the RGB data is first converted into YUV420, then put into a video stream. Along with geometry and texture, metadata indicating how the information is transformed from 2D back into the 3D space needs to be transmitted. Both streams are usually coded using a typical video encoder, such as HEVC, and the position of patches in the 2D canvas image may impact the compression efficiency. Furthermore, the placement of the patches in the 2D canvas image is the same for depth and texture, which may lead to a sub-optimal structure for coding for either depth or texture, since they present different characteristics The state-of-the-art in point cloud compression using video encoders represent point clouds as 3D patches and encode a 2D image formed by the projection of geometry and attributes into a 2D canvas. The packing of projected 3D patches into a 2D image is also known as 2D mapping of 3D point cloud data. Currently, the process has some limitations, such as: the patch orientation is always fixed, the position of patches are the same in geometry as well as texture, and the background filling process is the same also for both geometry and texture.

SUMMARY OF THE INVENTION

Methods for mapping 3D point cloud data into 2D surfaces are described herein. The methods utilize 3D surface patches to represent point clouds and perform flexible mapping of 3D patch surface data into 2D canvas images. Patches representing geometry and patches representing attributes such as textures are placed in different canvases, where the placement of each patch is done independently for geometry and texture, that is, geometry and texture patches do not need to be co-located, as in conventional point cloud mapping. Furthermore, methods include transformations of the 3D patch when placing it into the 2D canvas, for more efficient packing.

In one aspect, a method programmed in a non-transitory memory of a device comprises placing a first set of 3D patches of geometry on a first canvas, placing a second set of 3D patches of an attribute on a second canvas, flexibly orienting the first set of 3D patches of geometry on the first canvas and the second set of 3D patches of the attribute on the second canvas, adjusting a first depth of the first set of 3D patches of geometry on the first canvas and a second depth of the second set of 3D patches of the attribute on the second canvas, determining a safeguard distance between each patch of the first set of 3D patches of geometry on the first canvas, and determining the safeguard distance between each patch of the second set of 3D patches of the attribute on the second canvas and implementing background filling of the first canvas and the second canvas. The first set of 3D patches of geometry are independent from the second set of 3D patches of the attribute. The attribute includes texture or color information. Flexibly orienting the first set of 3D patches of geometry on the first canvas and the second set of 3D patches of the attribute on the second canvas includes rotating, mirroring and/or any combination thereof. Flexibly orienting the first set of 3D patches of geometry on the first canvas and the second set of 3D patches of the attribute on the second canvas includes selecting one of eight orientations. Flexibly orienting the first set of 3D patches of geometry on the first canvas and the second set of 3D patches of the attribute on the second canvas includes positioning the first set of 3D patches of geometry on the first canvas in a first orientation to minimize an amount of space occupied by the first set of 3D patches of geometry on the first canvas, and positioning the second set of 3D patches of the attribute on the second canvas in a second orientation to minimize the amount of space occupied by the second set of 3D patches of the attribute on the second canvas. The safeguard distance is at least one block. Background filling of the first canvas and the second canvas is implemented using a push-pull algorithm.

In another aspect, an apparatus comprises a non-transitory memory for storing an application, the application for: placing a first set of 3D patches of geometry on a first canvas, placing a second set of 3D patches of an attribute on a second canvas, flexibly orienting the first set of 3D patches of geometry on the first canvas and the second set of 3D patches of the attribute on the second canvas, adjusting a first depth of the first set of 3D patches of geometry on the first canvas and a second depth of the second set of 3D patches of the attribute on the second canvas, determining a safeguard distance between each patch of the first set of 3D patches of geometry on the first canvas, and determining the safeguard distance between each patch of the second set of 3D patches of the attribute on the second canvas and implementing background filling of the first canvas and the second canvas and a processor coupled to the memory, the processor configured for processing the application. The first set of 3D patches of geometry are independent from the second set of 3D patches of the attribute. The attribute includes texture or color information. Flexibly orienting the first set of 3D patches of geometry on the first canvas and the second set of 3D patches of the attribute on the second canvas includes rotating, mirroring and/or any combination thereof. Flexibly orienting the first set of 3D patches of geometry on the first canvas and the second set of 3D patches of the attribute on the second canvas includes selecting one of eight orientations. Flexibly orienting the first set of 3D patches of geometry on the first canvas and the second set of 3D patches of the attribute on the second canvas includes positioning the first set of 3D patches of geometry on the first canvas in a first orientation to minimize an amount of space occupied by the first set of 3D patches of geometry on the first canvas, and positioning the second set of 3D patches of the attribute on the second canvas in a second orientation to minimize the amount of space occupied by the second set of 3D patches of the attribute on the second canvas. The safeguard distance is at least one block. Background filling of the first canvas and the second canvas is implemented using a push-pull algorithm.

In another aspect, a system comprises a geometry module configure for placing a first set of 3D patches of geometry on a first canvas, an attribute module configured for placing a second set of 3D patches of an attribute on a second canvas, an orientation module configured for flexibly orienting the first set of 3D patches of geometry on the first canvas and the second set of 3D patches of the attribute on the second canvas, a depth module configured for adjusting a first depth of the first set of 3D patches of geometry on the first canvas and a second depth of the second set of 3D patches of the attribute on the second canvas, a safeguard module configured for determining a safeguard distance between each patch of the first set of 3D patches of geometry on the first canvas, and determining the safeguard distance between each patch of the second set of 3D patches of the attribute on the second canvas and a background module configured for implementing background filling of the first canvas and the second canvas. The first set of 3D patches of geometry are independent from the second set of 3D patches of the attribute. The attribute includes texture or color information. Flexibly orienting the first set of 3D patches of geometry on the first canvas and the second set of 3D patches of the attribute on the second canvas includes rotating, mirroring and/or any combination thereof. Flexibly orienting the first set of 3D patches of geometry on the first canvas and the second set of 3D patches of the attribute on the second canvas includes selecting one of eight orientations. Flexibly orienting the first set of 3D patches of geometry on the first canvas and the second set of 3D patches of the attribute on the second canvas includes positioning the first set of 3D patches of geometry on the first canvas in a first orientation to minimize an amount of space occupied by the first set of 3D patches of geometry on the first canvas, and positioning the second set of 3D patches of the attribute on the second canvas in a second orientation to minimize the amount of space occupied by the second set of 3D patches of the attribute on the second canvas. The safeguard distance is at least one block. Background filling of the first canvas and the second canvas is implemented using a push-pull algorithm.

DETAILED DESCRIPTION OF THE PREFERRED EMBODIMENT

Methods for mapping 3D point cloud data into 2D surfaces are described herein. The methods utilize 3D surface patches to represent point clouds and perform flexible mapping of 3D patch surface data into 2D canvas images.

Patches representing geometry and patches representing attributes such as textures are placed in different canvases, where the placement of each patch is done independently for geometry and texture, that is, geometry and texture patches do not need to be co-located, as in conventional point cloud mapping. Furthermore, the methods include transformations of the 3D patch when placing it into the 2D canvas, for more efficient packing. For example, patches can be rotated, mirrored and have the luminance value adjusted before being placed in the 2D canvas image.

Another unique aspect of the point cloud mapping methods is the utilization of packing techniques for improved coding, whereby some of the techniques include a method for separating patches in the 2D canvas to guarantee a minimal distance between patches, and multiple background filling methods, for example, methods more appropriate for geometry and/or texture, such as the push-pull background filling algorithm for texture maps.

In order to allow for a more flexible and optimal coding of point clouds using patch projection, methods are described herein to handle 2D mapping of 3D point clouds. The methods described herein optimize the point cloud mapping for geometry and attributes (e.g., texture): independent canvas arrangement, flexible patch orientation, luminance adjustment, safeguard distance between patches and multiple background filling.

In some embodiments, a point cloud is represented as a collection of orthogonal projections of patches of the object's surface and project each patch of points from 3D to 2D, grouping all of the patches in a 2D canvas image but performing independent arrangements for geometry and each attribute.

In some embodiments, each patch is able to be projected on the 2D canvas images with several different orientations in geometry and in any other attribute.

In some embodiments, each patch is able to be placed on the 2D canvas images with different luminance levels for geometry representation.

In some embodiments, patches of geometry or attributes are able to have different safeguard distances between patches projected onto the 2D canvas image.

In some embodiments, different methods are utilized for filling unused pixels in the canvas image that optimize the coding of either geometry or any other attribute.

In some embodiments, the 3D to 2D mapping described herein is utilized within a motion compensation implementation such as described in U.S. Patent App. No. Atty Docket No. SONY-70900, titled, "MOTION COMPENSATION OF GEOMETRY INFORMATION," which is hereby incorporated by reference in its entirety for all purposes.

Figure 1:
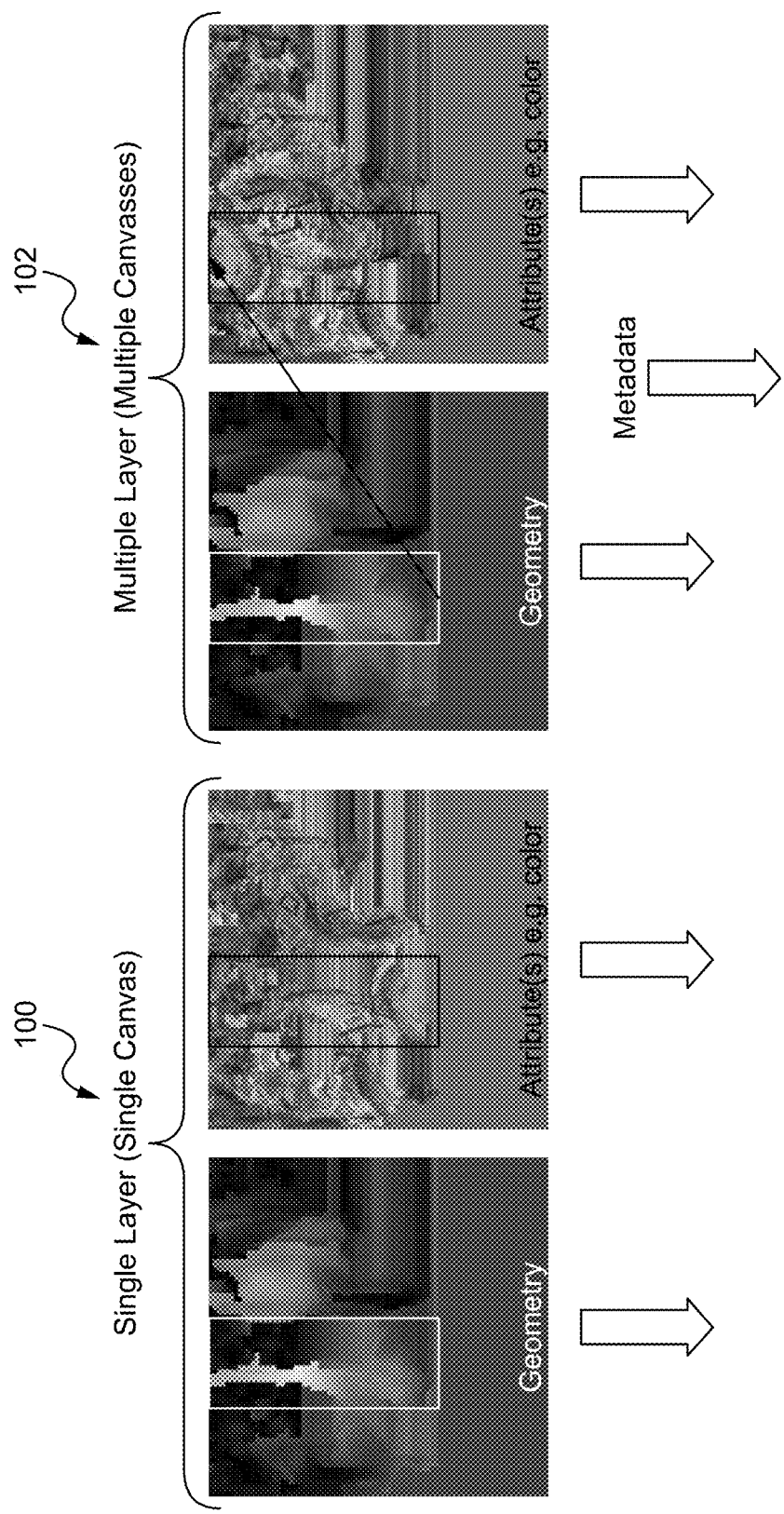
FIG. 1 illustrates images of an independent canvas arrangement according to some embodiments.

FIG. 1 illustrates images of an independent canvas arrangement according to some embodiments. For a single layer 100 (or single canvas), there is a geometry and one or more attributes (e.g., color), the geometry and attribute are linked together and are dependent upon each other. For a multiple layer 102 (or multiple canvases), the geometry and one or more attributes are not linked, so they do not need to be placed at the same position. The patches from geometry/attributes are able to be changed and/or placed independent of each other. For example, the geometry may be better in a certain configuration or position, while the color may be better in a different configuration/position. Metadata is sent indicating the geometry and attribute information. For example, the metadata is able to include orientation and identification information of each patch.

By relaxing the condition that the geometry and attribute (e.g., texture, color) patches need to be in the same place (or have the same rotation, resolution or other), flexible texture mapping is able to be implemented which enables depth and texture (or other attributes) to have completely different mappings. Exemplary code includes:

| group_of_frames_auxilary_information( ) { | Descriptor |
|---|---|
| patch_count | u(32) |
| occupancy_precision | u(8) |
| max_candidate_Count | u(8) |
| bit_count_u0 | u(8) |
| bit_count_v0 | u(8) |
| bit_count_u1 | u(8) |
| bit_count_v1 | u(8) |
| bit_count_d1 | u(8) |
| occupancy_aux_stream_size | u(32) |

| group_of_frames_auxilary_information( ) { | Descriptor |
|---|---|
| ByteCount+=15 | |
| for(i = 0; i<patchCount; i++) { | |
|   patchList[i].patch_u0 | ae(v) |
|   patchList[i].patch_v0 | ae(v) |
|   patchList[i].patch_u1 | ae(v) |
|   patchList[i].patch_v1 | ae(v) |
|   patchList[i].patch_d1 | ae(v) |
|   patchList[i].delta_size_u0 | se(v) |
|   patchList[i].delta_size_v0 | se(v) |
|   patchList[i].normal_axis | ae(v) |
|   patchList[i].collocated_texture | u(8) |
|   if(patchList[i].collocated_texture > 0) { | |
|     patchList[i].texture_mapping_information( ) | |
|   } | |
| } | |
| for (i=0; i<blockCount; i++) { | |
|   if(candidatePatches[i].size( ) == 1) | |
|     blockToPatch[i] = candidatePatches[i][0] | |
|   else { | |
|     candidate_index | ae(v) |
|     if(candidate_index == max_candidate_count) | |
|       blockToPatch[i] = patch_index | ae(v) |
|     else | |
|       blockToPatch[i] = | |
|       candidatePatches[i][candidate_index] | |
|   } | |
| } | |
| ByteCount += occupancy_auxilary_stream_size | |
| } | |

Figure 2:
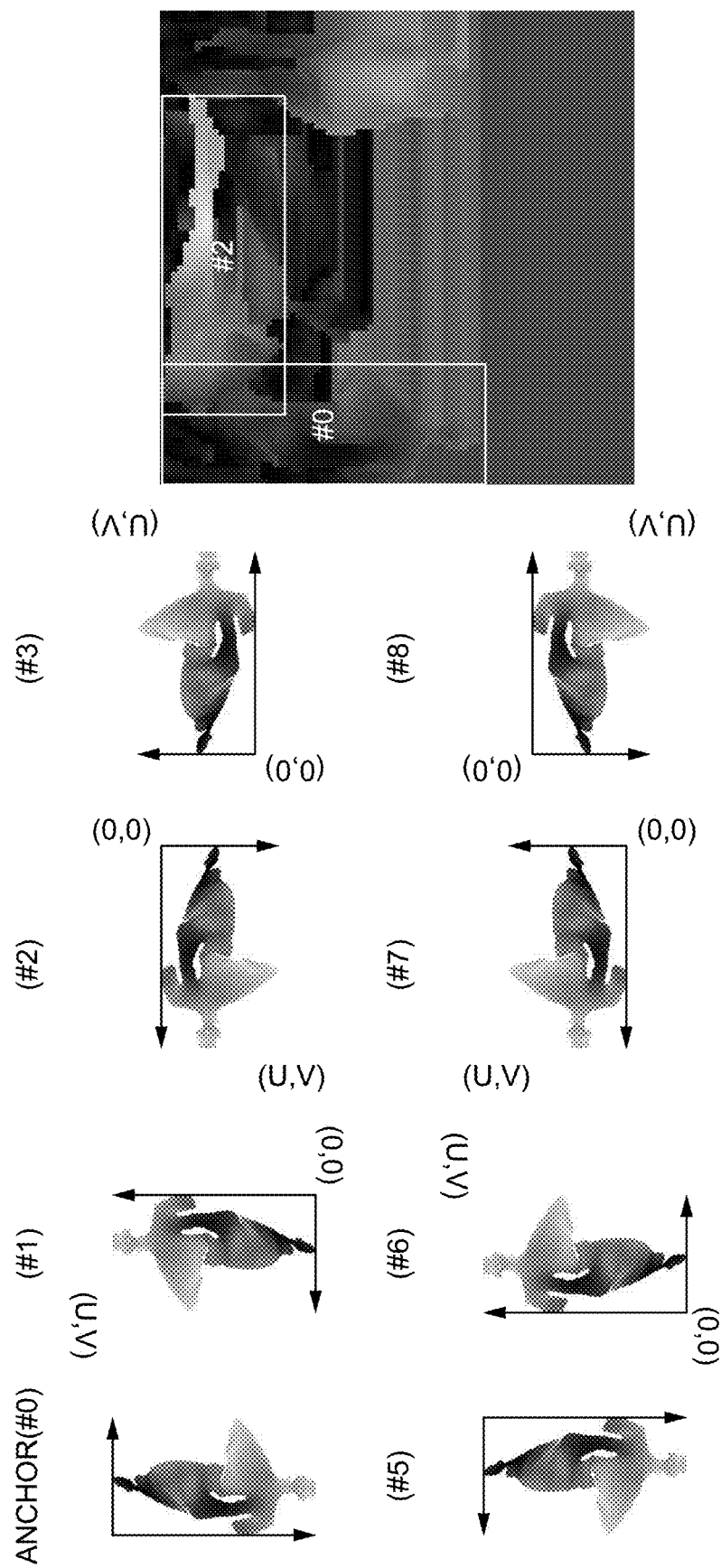
FIG. 2 illustrates flexible patch orientation according to some embodiments.

FIG. 2 illustrates flexible patch orientation according to some embodiments. Unlike previous implementations, the patches are able to be rotated, mirrored or otherwise re-oriented. For example, there are 8 different orientations of a patch, although any number of orientations is possible. Furthering the example, #0 is the default orientation, then #1 is the default rotated clock-wise 180 degrees, #2 is the default rotated clock-wise 90 degrees, #3 is the default rotated counter clock-wise 90 degrees, #5 is the default mirrored horizontally, #6 is the default mirrored vertically, #7 is the default rotated clock-wise 90 degrees and mirrored vertically, and #8 is the default rotated counter clock-wise 90 degrees and mirrored vertically. By orienting the patches, the patches are able to be packed tighter which saves memory and enables more efficient compression. Exemplary code includes:

| group_of_frames_auxilary_information( ) { | Descriptor |
|---|---|
| patch_count | u(32) |
| occupancy_precision | u(8) |
| max_candidate_count | u(8) |
| bit_count_u0 | u(8) |
| bit_count_v0 | u(8) |
| bit_count_u1 | u(8) |
| bit_count_v1 | u(8) |
| bit_count_d1 | u(8) |
| occupancy_aux_stream_size | u(32) |
| ByteCount+=15 | |
| for(i = 0; i<patchCount; i++) { | |
|   patchList[i].patch_u0 | ae(v) |
|   patchList[i].patch_v0 | ae(v) |
|   patchList[i].orientation | ae(3) |
|   patchList[i].patch_u1 | ae(v) |
|   patchList[i].patch_v1 | ae(v) |
|   patchList[i].patch_d1 | ae(v) |
|   patchList[i].delta_size_u0 | se(v) |
|   patchList[i].delta_size_v0 | se(v) |
|   patchList[i].normal_axis | ae(v) |
| } | |

-continued

| group_of_frames_auxilary_information( ) { | Descriptor |
|---|---|
| for (i=0; i<blockCount; i++) { | |
|   if(candidatePatches[i].size( ) == 1) | |
|     blockToPatch[i] = candidatePatches[i][0] | |
|   else { | |
|     candidate_index | ae(v) |
|     if(candidate_index == max_candidate_count) | |
|       blockToPatch[i] = patch_index | ae(v) |
|     else | |
|       blockToPatch[i] = | |
|       candidatePatches[i][candidate_index] | |
|   } | |
| } | |
| ByteCount += occupancy_auxilary_stream_size | |
| } | |

Figure 3:
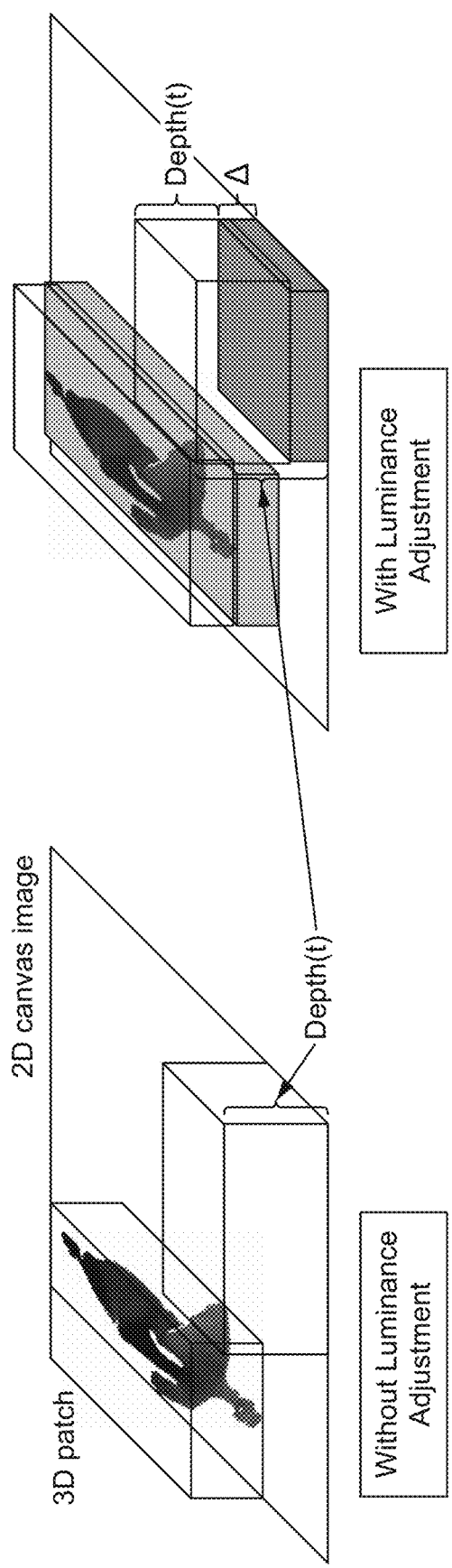
FIG. 3 illustrates luminance adjustment according to some embodiments.

FIG. 3 illustrates luminance adjustment according to some embodiments. The luminous adjustment allows the patch to be adjusted in the z axis/direction. The motion in the z direction corresponds to a depth translation which corresponds to a value added to the grayscale. Depth translation enables the patch to be moved in the z direction. For example, an original patch has a depth(t), and then at depth(t+1), the patch has moved a delta amount. The delta is able to be compensated for by adding the value to the luminous value (or a similar value).

Figure 4:
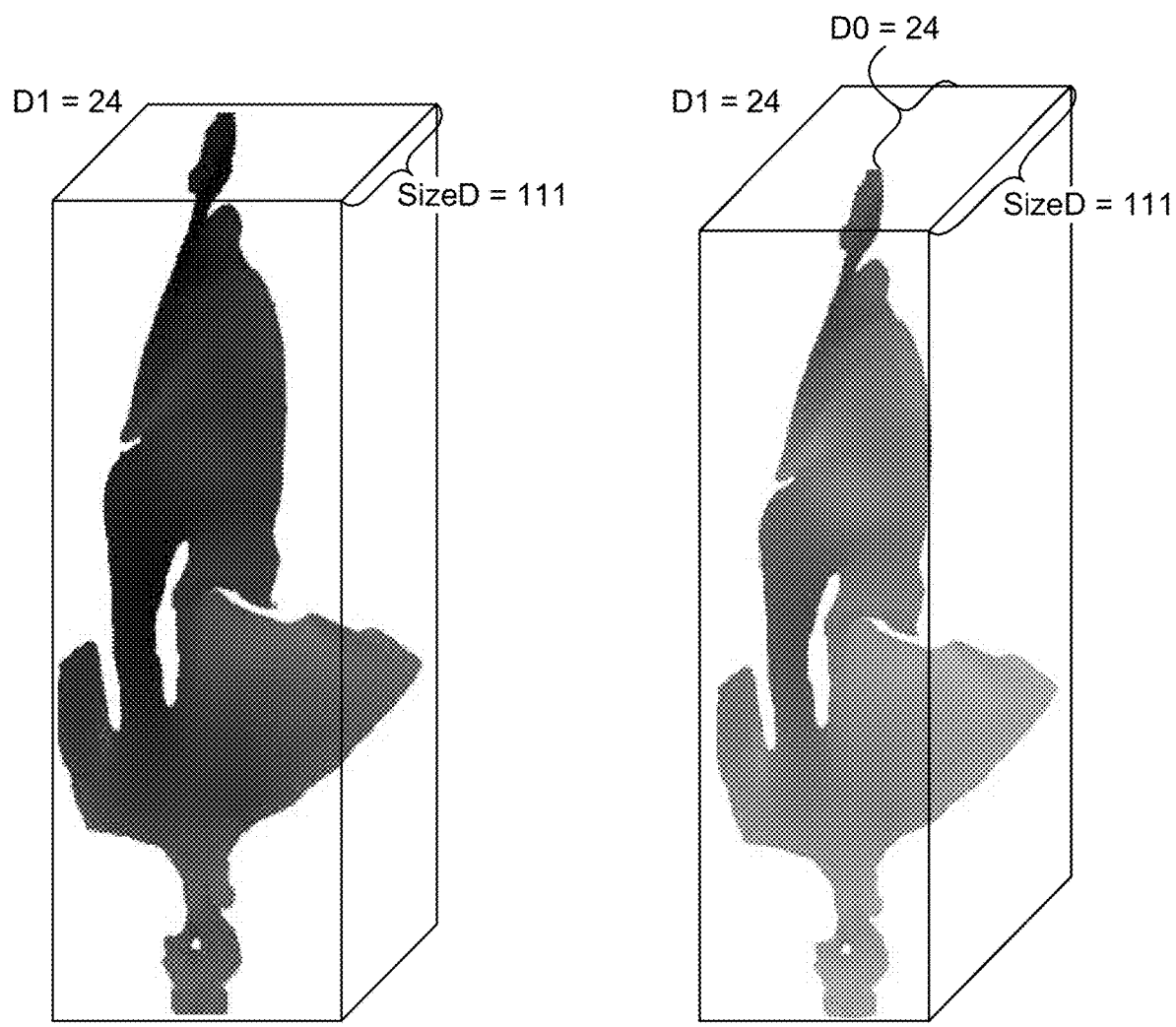
FIG. 4 illustrates a diagram of luminance adjustment according to some embodiments.

FIG. 4 illustrates a diagram of luminance adjustment according to some embodiments. As described in FIG. 3, the luminance is able to be adjusted per patch to always have a specified mean value (e.g., around 128). In some embodiments, the delta from the current value and the mean value is able to be sent to an occupancy map or other data structure.

Included herein is exemplary code regarding the luminance adjustment:

| group_of_frames_auxilary_information( ) { | Descriptor |
|---|---|
| patch_count | u(32) |
| occupancy_precision | u(8) |
| bit_count_u0 | u(8) |
| bit_count_v0 | u(8) |
| bit_count_u1 | u(8) |
| bit_count_v1 | u(8) |
| bit_count_d1 | u(8) |
| occupancy_aux_stream_size | u(32) |
| ByteCount+=15 | |
| for(i = 0; i<patchCount; i++) { | |
|   patchList[i].patch_u0 | ae(v) |
|   patchList[i].patch_v0 | ae(v) |
|   patchList[i].patch_u1 | ae(v) |
|   patchList[i].patch_v1 | ae(v) |
|   patchList[i].patch_d1 | ae(v) |
|   patchList[i].delta_size_u0 | se(v) |
|   patchList[i].delta_size_v0 | se(v) |
|   patchList[i].normal_axis | ae(v) |
| } | |
| for (i=0; i<blockCount; i++) { | |
|   if(candidatePatches[i].size( ) == 1) | |
|     blockToPatch[i] = candidatePatches[i][0] | |
|   else { | |
|     candidate_index | ae(v) |
|     if(candidate_index == max_candidate_count) | |
|       blockToPatch[i] = patch_index | ae(v) |
|     else | |
|       blockToPatch[i] = | |
|       candidatePatches[i][candidate_index] | |
|   } | |
| } | |
| ByteCount += occupancy_auxilary_stream_size | |
| } | |

Figure 5:
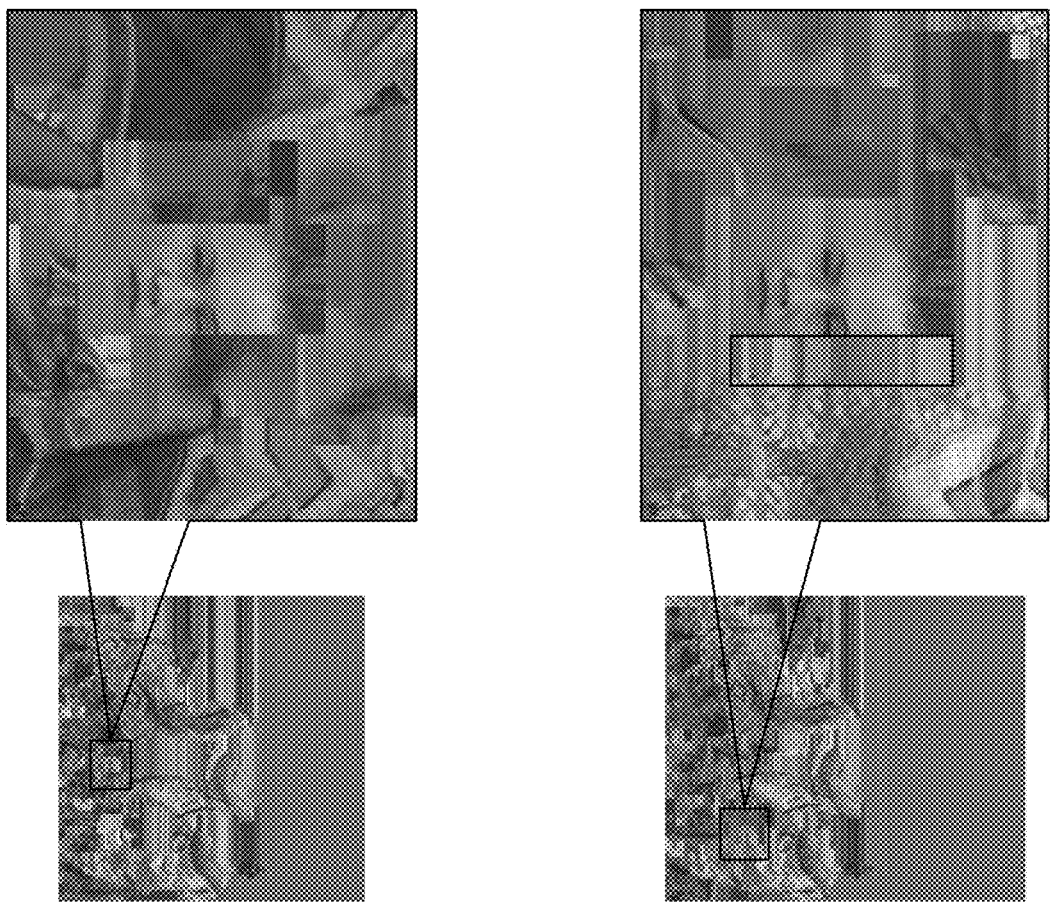
FIG. 5 illustrates implementing safe-guard distances for point cloud mapping according to some embodiments.
Figure 5:
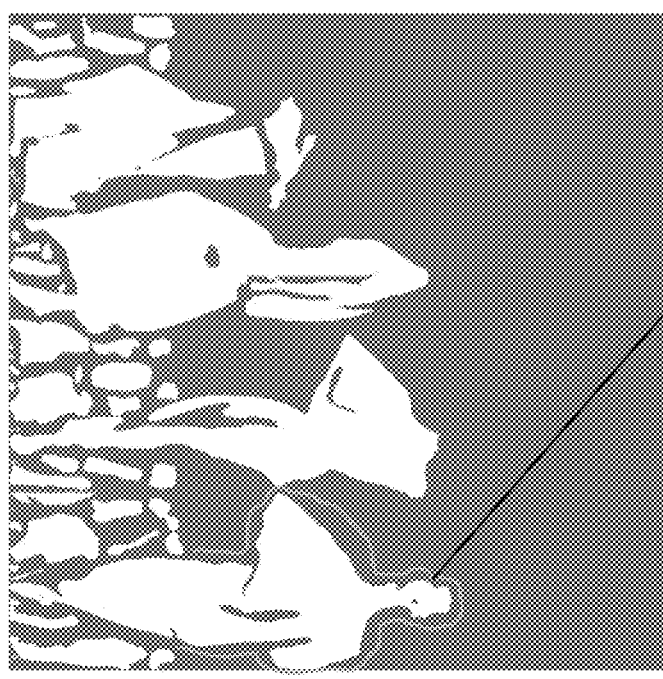

FIG. 5 illustrates implementing safe-guard distances for point cloud mapping according to some embodiments. When the patches are placed on the 2D canvas, if the patches are placed too close to each other, they could influence each other. By placing safe-guards (e.g., a specified distance between the patches), the influence will be minimized or eliminated.

The safe-guard is able to be any size such as a 1-block distance between each patch. A larger block distance is able to be implemented, but that would also increase the area for including all of the patches or reduce the number of patches in a specified size. In some embodiments, a balance is determined between the block distance between each patch and avoiding color leaking problems from background filling. For example, the block size buffer is increased until there are no detected color leaking problems.

To increase the number of patches per canvas without increasing the overall canvas size, a Tetris-style packing implementation is able to be implemented. Tetris is a video game which involves trying to fit varying shapes into the smallest amount of space possible. Similarly, since the patches are able to be rotated and/or flipped, it is possible to maneuver them into a position to optimize the number of patches per canvas area. For example, in a test, by utilizing Tetris-style packing, a canvas was reduced from 218,714 bytes to 216,882 bytes. Sometimes, Tetris-style packing may result in a larger canvas size. Therefore, in some embodiments, the result of Tetris-style packing and standard packing is compared, and the smaller result (e.g., fewer bits/bytes) is used.

Figure 6:
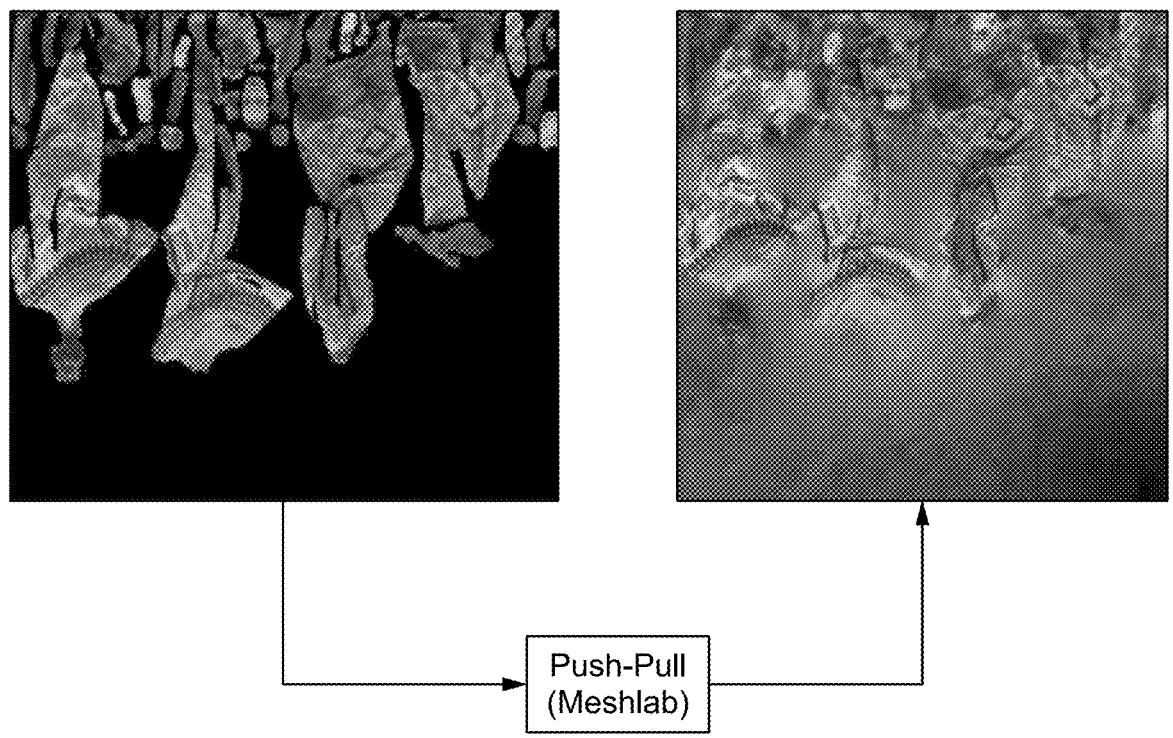
FIG. 6 illustrates images for multiple background filling for geometry and attributes according to some embodiments.

FIG. 6 illustrates images for multiple background filling for geometry and attributes according to some embodiments. Instead of using dilation, a multi-resolution filling algorithm also referred to as a push-pull implementation is implemented. The push-pull algorithm is able to be implemented in any manner such as the implementation found in the Meshlab program for background filling of UV-mapped meshes. Background filling provides corresponding attributes (e.g., color, texture) of the patches to the background of the canvas.

Figure 7:
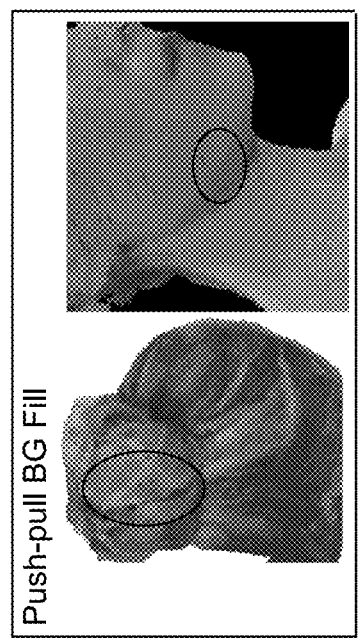
FIG. 7 illustrates images using the push-pull algorithm of Meshlab to fill a background according to some embodiments.
Figure 7:
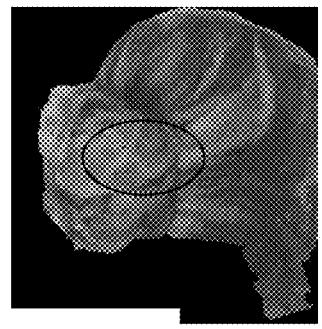
Figure 7:
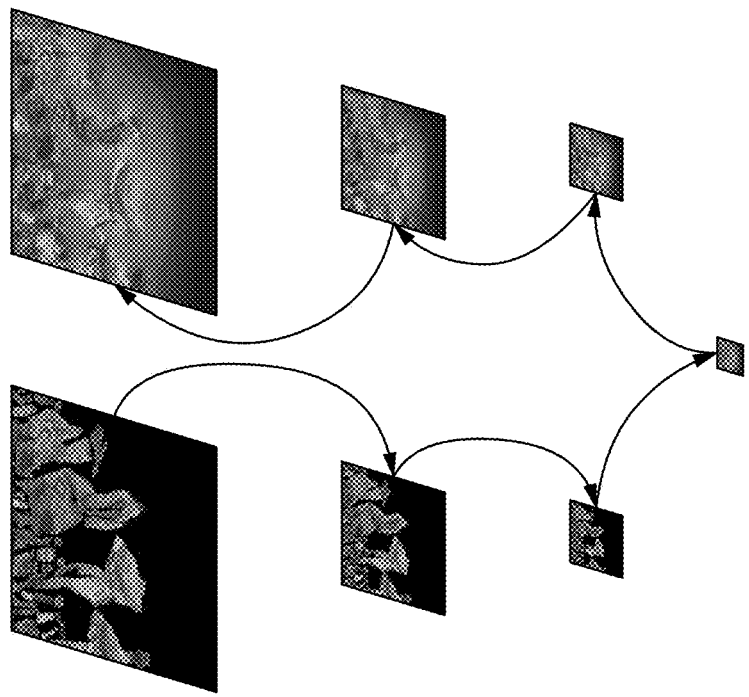

FIG. 7 illustrates images using the push-pull algorithm of Meshlab to fill a background according to some embodiments.

Figure 8:
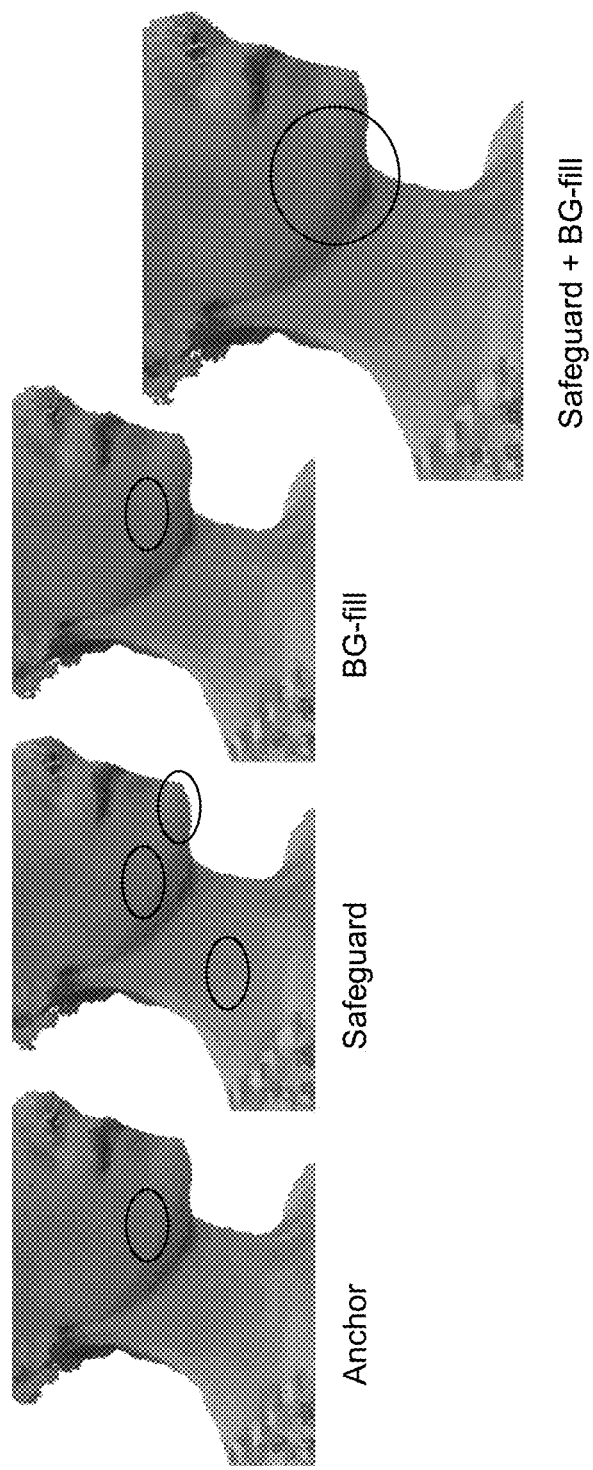
FIG. 8 illustrates images utilizing the safeguard distance with push-pull background filling according to some embodiments.

FIG. 8 illustrates images utilizing the safeguard distance with push-pull background filling according to some embodiments. By implementing the safeguard distance with push-pull background filling, leaking is avoided.

Figure 9:
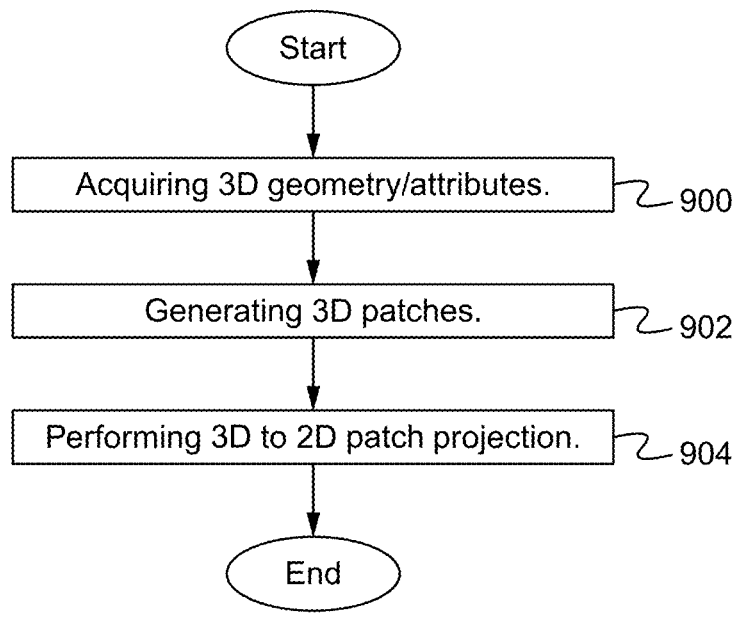
FIG. 9 illustrates a flowchart of a point cloud mapping method according to some embodiments.

FIG. 9 illustrates a flowchart of a point cloud mapping method according to some embodiments. In the step 900, a 3D geometry (with attributes) is acquired. The 3D geometries are a sequence of an initial point cloud (or other 3D data) (e.g., a point cloud for each instance in time). The 3D geometries are able to be acquired in any manner such as using LIDAR and/or any other 3D content acquisition device (e.g., camera). In the step 902, 3D patches are acquired/generated from the 3D geometry. The 3D patches describe the surface of the point cloud by identifying points that have similar properties. The points that have similar properties are the points that have similar normals (e.g., points that are pointing to the same location and are connected in 3D space). The 3D patches are able to be acquired/generated in any manner such as 3D patch generation from the standard for point cloud compression. For example, points connected on the surface of a 3D geometry are considered 3D patches (e.g., 3D points connected in space which cover part of a surface). For example, for a point cloud of a person, half of the person's face is one patch, and the other half of the person's face is a second patch. For every frame (or time instance), a 3D geometry is broken up into 3D patches. The 3D patches have attributes such as color, texture, resolution and others. In the step 904, 3D to 2D patch projection is performed. The 3D patches are able to be projected to the 2D UV domain by translating the 3D patches to the 2D domain. As described herein patch projection includes independent canvas arrangement (where the geometry canvas and attribute canvas(es) are separate/independent), flexible patch orientation, luminance adjustment, safeguarding, and background filling.

In some embodiments, the method includes fewer or additional steps. For example, the method includes the steps: 3D patch correspondence, 3D matched patch motion compensation and 2D motion compensation. In some embodiments, the order of the steps is modified.

Figure 10:
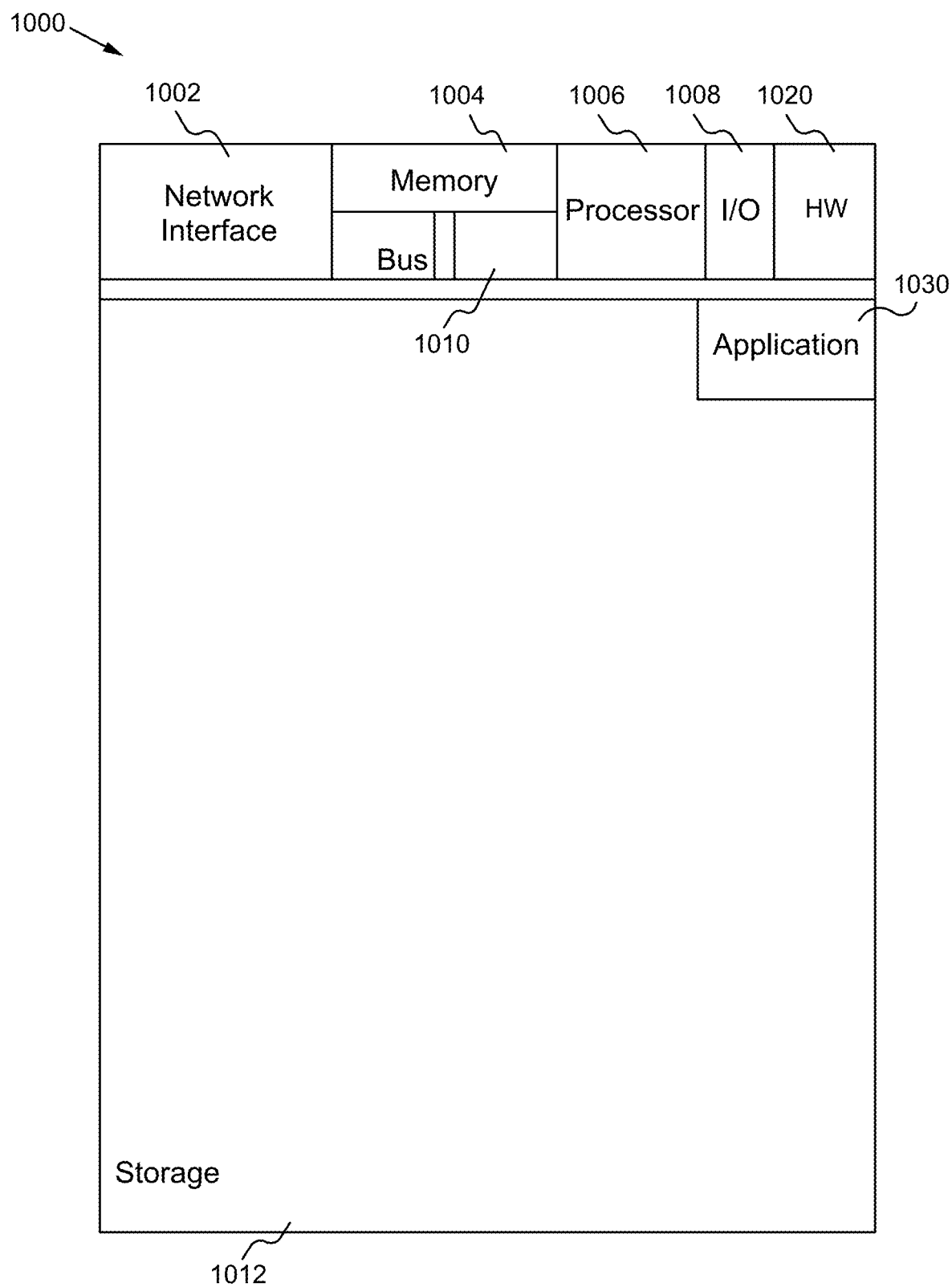
FIG. 10 illustrates a block diagram of an exemplary computing device configured to implement the point cloud mapping method according to some embodiments.

FIG. 10 illustrates a block diagram of an exemplary computing device configured to implement the point cloud mapping method according to some embodiments. The computing device 1000 is able to be used to acquire, store, compute, process, communicate and/or display information such as images and videos including 3D content. The computing device 1000 is able to implement any of the point cloud mapping method aspects. In general, a hardware structure suitable for implementing the computing device 1000 includes a network interface 1002, a memory 1004, a processor 1006, I/O device(s) 1008, a bus 1010 and a storage device 1012. The choice of processor is not critical as long as a suitable processor with sufficient speed is chosen. The memory 1004 is able to be any conventional computer memory known in the art. The storage device 1012 is able to include a hard drive, CDROM, CDRW, DVD, DVDRW, High Definition disc/drive, ultra-HD drive, flash memory card or any other storage device. The computing device 1000 is able to include one or more network interfaces 1002. An example of a network interface includes a network card connected to an Ethernet or other type of LAN. The I/O device(s) 1008 are able to include one or more of the following: keyboard, mouse, monitor, screen, printer, modem, touchscreen, button interface and other devices. Point cloud mapping application(s) 1030 used to implement the point cloud mapping method are likely to be stored in the storage device 1012 and memory 1004 and processed as applications are typically processed. More or fewer components shown in FIG. 10 are able to be included in the computing device 1000. In some embodiments, point cloud mapping hardware 1020 is included. Although the computing device 1000 in FIG. 10 includes applications 1030 and hardware 1020 for the point cloud mapping method, the point cloud mapping method is able to be implemented on a computing device in hardware, firmware, software or any combination thereof. For example, in some embodiments, the point cloud mapping applications 1030 are programmed in a memory and executed using a processor. In another example, in some embodiments, the point cloud mapping hardware 1020 is programmed hardware logic including gates specifically designed to implement the point cloud mapping method.

In some embodiments, the point cloud mapping application(s) 1030 include several applications and/or modules. In some embodiments, modules include one or more sub-modules as well. In some embodiments, fewer or additional modules are able to be included.

In some embodiments, the point cloud mapping hardware 1020 includes camera components such as a lens, an image sensor, and/or any other camera components.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, an augmented reality device, a virtual reality device, smart jewelry (e.g., smart watch), a vehicle (e.g., a self-driving vehicle) or any other suitable computing device.

To utilize the point cloud mapping method described herein, a device acquires or receives 3D content and processes and/or sends the content in an optimized manner to enable proper, efficient display of the 3D content. The point cloud mapping method is able to be implemented with user assistance or automatically without user involvement.

In operation, the point cloud mapping method more efficiently processes 3D content including compressing the data such that much less information is sent.

Some Embodiments of Point Cloud Mapping

1. A method programmed in a non-transitory memory of a device comprising:

placing a first set of 3D patches of geometry on a first canvas;

placing a second set of 3D patches of an attribute on a second canvas;

flexibly orienting the first set of 3D patches of geometry on the first canvas and the second set of 3D patches of the attribute on the second canvas;

adjusting a first depth of the first set of 3D patches of geometry on the first canvas and a second depth of the second set of 3D patches of the attribute on the second canvas;

determining a safeguard distance between each patch of the first set of 3D patches of geometry on the first canvas, and determining the safeguard distance between each patch of the second set of 3D patches of the attribute on the second canvas; and implementing background filling of the first canvas and the second canvas.

2. The method of clause 1 wherein the first set of 3D patches of geometry are independent from the second set of 3D patches of the attribute.

3. The method of clause 1 wherein the attribute includes texture or color information.

4. The method of clause 1 wherein flexibly orienting the first set of 3D patches of geometry on the first canvas and the second set of 3D patches of the attribute on the second canvas includes rotating, mirroring and/or any combination thereof.

5. The method of clause 1 wherein flexibly orienting the first set of 3D patches of geometry on the first canvas and the second set of 3D patches of the attribute on the second canvas includes selecting one of eight orientations.

6. The method of clause 1 wherein flexibly orienting the first set of 3D patches of geometry on the first canvas and the second set of 3D patches of the attribute on the second canvas includes positioning the first set of 3D patches of geometry on the first canvas in a first orientation to minimize an amount of space occupied by the first set of 3D patches of geometry on the first canvas, and positioning the second set of 3D patches of the attribute on the second canvas in a second orientation to minimize the amount of space occupied by the second set of 3D patches of the attribute on the second canvas.

7. The method of clause 1 wherein the safeguard distance is at least one block.

8. The method of clause 1 wherein background filling of the first canvas and the second canvas is implemented using a push-pull algorithm.
9. An apparatus comprising:
   a non-transitory memory for storing an application, the application for:
      placing a first set of 3D patches of geometry on a first canvas;
      placing a second set of 3D patches of an attribute on a second canvas;
      flexibly orienting the first set of 3D patches of geometry on the first canvas and the second set of 3D patches of the attribute on the second canvas;
      adjusting a first depth of the first set of 3D patches of geometry on the first canvas and a second depth of the second set of 3D patches of the attribute on the second canvas;
      determining a safeguard distance between each patch of the first set of 3D patches of geometry on the first canvas, and determining the safeguard distance between each patch of the second set of 3D patches of the attribute on the second canvas; and
      implementing background filling of the first canvas and the second canvas; and
   a processor coupled to the memory, the processor configured for processing the application.
10. The apparatus of clause 9 wherein the first set of 3D patches of geometry are independent from the second set of 3D patches of the attribute.
11. The apparatus of clause 9 wherein the attribute includes texture or color information.
12. The apparatus of clause 9 wherein flexibly orienting the first set of 3D patches of geometry on the first canvas and the second set of 3D patches of the attribute on the second canvas includes rotating, mirroring and/or any combination thereof.
13. The apparatus of clause 9 wherein flexibly orienting the first set of 3D patches of geometry on the first canvas and the second set of 3D patches of the attribute on the second canvas includes selecting one of eight orientations.
14. The apparatus of clause 9 wherein flexibly orienting the first set of 3D patches of geometry on the first canvas and the second set of 3D patches of the attribute on the second canvas includes positioning the first set of 3D patches of geometry on the first canvas in a first orientation to minimize an amount of space occupied by the first set of 3D patches of geometry on the first canvas, and positioning the second set of 3D patches of the attribute on the second canvas in a second orientation to minimize the amount of space occupied by the second set of 3D patches of the attribute on the second canvas.
15. The apparatus of clause 9 wherein the safeguard distance is at least one block.
16. The apparatus of clause 9 wherein background filling of the first canvas and the second canvas is implemented using a push-pull algorithm.
17. A system comprising:
   a geometry module configure for placing a first set of 3D patches of geometry on a first canvas;
   an attribute module configured for placing a second set of 3D patches of an attribute on a second canvas;
   an orientation module configured for flexibly orienting the first set of 3D patches of geometry on the first canvas and the second set of 3D patches of the attribute on the second canvas;
   a depth module configured for adjusting a first depth of the first set of 3D patches of geometry on the first canvas and a second depth of the second set of 3D patches of the attribute on the second canvas;
   a safeguard module configured for determining a safeguard distance between each patch of the first set of 3D patches of geometry on the first canvas, and determining the safeguard distance between each patch of the second set of 3D patches of the attribute on the second canvas; and
   a background module configured for implementing background filling of the first canvas and the second canvas.
18. The system of clause 17 wherein the first set of 3D patches of geometry are independent from the second set of 3D patches of the attribute.
19. The system of clause 17 wherein the attribute includes texture or color information.
20. The system of clause 17 wherein flexibly orienting the first set of 3D patches of geometry on the first canvas and the second set of 3D patches of the attribute on the second canvas includes rotating, mirroring and/or any combination thereof.
21. The system of clause 17 wherein flexibly orienting the first set of 3D patches of geometry on the first canvas and the second set of 3D patches of the attribute on the second canvas includes selecting one of eight orientations.
22. The system of clause 17 wherein flexibly orienting the first set of 3D patches of geometry on the first canvas and the second set of 3D patches of the attribute on the second canvas includes positioning the first set of 3D patches of geometry on the first canvas in a first orientation to minimize an amount of space occupied by the first set of 3D patches of geometry on the first canvas, and positioning the second set of 3D patches of the attribute on the second canvas in a second orientation to minimize the amount of space occupied by the second set of 3D patches of the attribute on the second canvas.
23. The system of clause 17 wherein the safeguard distance is at least one block.
24. The system of clause 17 wherein background filling of the first canvas and the second canvas is implemented using a push-pull algorithm.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:
1. A method programmed in a non-transitory memory of a device comprising:
   placing a first set of 3D patches of geometry on a first canvas;
   placing a second set of 3D patches of an attribute on a second canvas, wherein the first set of 3D patches of geometry are independent from the second set of 3D patches of the attribute;
   flexibly orienting the first set of 3D patches of geometry on the first canvas and the second set of 3D patches of the attribute on the second canvas;
   adjusting a first depth of the first set of 3D patches of geometry on the first canvas and a second depth of the second set of 3D patches of the attribute on the second canvas, wherein a delta of depth movement is compensated for by adding a luminous value to the delta;

determining a safeguard distance between each patch of the first set of 3D patches of geometry on the first canvas, and determining the safeguard distance between each patch of the second set of 3D patches of the attribute on the second canvas; and implementing background filling of the first canvas and the second canvas.

2. The method of claim 1 wherein the attribute includes texture or color information.

3. The method of claim 1 wherein flexibly orienting the first set of 3D patches of geometry on the first canvas and the second set of 3D patches of the attribute on the second canvas includes rotating, mirroring and/or any combination thereof.

4. The method of claim 1 wherein flexibly orienting the first set of 3D patches of geometry on the first canvas and the second set of 3D patches of the attribute on the second canvas includes selecting one of eight orientations.

5. The method of claim 1 wherein flexibly orienting the first set of 3D patches of geometry on the first canvas and the second set of 3D patches of the attribute on the second canvas includes positioning the first set of 3D patches of geometry on the first canvas in a first orientation to minimize an amount of space occupied by the first set of 3D patches of geometry on the first canvas, and positioning the second set of 3D patches of the attribute on the second canvas in a second orientation to minimize the amount of space occupied by the second set of 3D patches of the attribute on the second canvas.

6. The method of claim 1 wherein the safeguard distance is at least one block.

7. The method of claim 1 wherein background filling of the first canvas and the second canvas is implemented using a push-pull algorithm.

8. An apparatus comprising:
a non-transitory memory for storing an application, the application for:
placing a first set of 3D patches of geometry on a first canvas;
placing a second set of 3D patches of an attribute on a second canvas, wherein the first set of 3D patches of geometry are independent from the second set of 3D patches of the attribute;
flexibly orienting the first set of 3D patches of geometry on the first canvas and the second set of 3D patches of the attribute on the second canvas;
adjusting a first depth of the first set of 3D patches of geometry on the first canvas and a second depth of the second set of 3D patches of the attribute on the second canvas, wherein a delta of depth movement is compensated for by adding a luminous value to the delta;
determining a safeguard distance between each patch of the first set of 3D patches of geometry on the first canvas, and determining the safeguard distance between each patch of the second set of 3D patches of the attribute on the second canvas; and
implementing background filling of the first canvas and the second canvas; and
a processor coupled to the memory, the processor configured for processing the application.

9. The apparatus of claim 8 wherein the attribute includes texture or color information.

10. The apparatus of claim 8 wherein flexibly orienting the first set of 3D patches of geometry on the first canvas and the second set of 3D patches of the attribute on the second canvas includes rotating, mirroring and/or any combination thereof.

11. The apparatus of claim 8 wherein flexibly orienting the first set of 3D patches of geometry on the first canvas and the second set of 3D patches of the attribute on the second canvas includes selecting one of eight orientations.

12. The apparatus of claim 8 wherein flexibly orienting the first set of 3D patches of geometry on the first canvas and the second set of 3D patches of the attribute on the second canvas includes positioning the first set of 3D patches of geometry on the first canvas in a first orientation to minimize an amount of space occupied by the first set of 3D patches of geometry on the first canvas, and positioning the second set of 3D patches of the attribute on the second canvas in a second orientation to minimize the amount of space occupied by the second set of 3D patches of the attribute on the second canvas.

13. The apparatus of claim 8 wherein the safeguard distance is at least one block.

14. The apparatus of claim 8 wherein background filling of the first canvas and the second canvas is implemented using a push-pull algorithm.

15. A system comprising:
a geometry module configure for placing a first set of 3D patches of geometry on a first canvas;
an attribute module configured for placing a second set of 3D patches of an attribute on a second canvas, wherein the first set of 3D patches of geometry are independent from the second set of 3D patches of the attribute;
an orientation module configured for flexibly orienting the first set of 3D patches of geometry on the first canvas and the second set of 3D patches of the attribute on the second canvas;
a depth module configured for adjusting a first depth of the first set of 3D patches of geometry on the first canvas and a second depth of the second set of 3D patches of the attribute on the second canvas, wherein a delta of depth movement is determined based on a difference of a first depth at time t and a second depth at time t+1 and is compensated for by adding a luminous value to the delta;
a safeguard module configured for determining a safeguard distance between each patch of the first set of 3D patches of geometry on the first canvas, and determining the safeguard distance between each patch of the second set of 3D patches of the attribute on the second canvas; and
a background module configured for implementing background filling of the first canvas and the second canvas.

16. The system of claim 15 wherein the attribute includes texture or color information.

17. The system of claim 15 wherein flexibly orienting the first set of 3D patches of geometry on the first canvas and the second set of 3D patches of the attribute on the second canvas includes rotating, mirroring and/or any combination thereof.

18. The system of claim 15 wherein flexibly orienting the first set of 3D patches of geometry on the first canvas and the second set of 3D patches of the attribute on the second canvas includes selecting one of eight orientations.

19. The system of claim 15 wherein flexibly orienting the first set of 3D patches of geometry on the first canvas and the second set of 3D patches of the attribute on the second canvas includes positioning the first set of 3D patches of geometry on the first canvas in a first orientation to minimize an amount of space occupied by the first set of 3D patches of geometry on the first canvas, and positioning the second set of 3D patches of the attribute on the second canvas in a second orientation to minimize the amount of space occupied by the second set of 3D patches of the attribute on the second canvas.

20. The system of claim 15 wherein the safeguard distance is at least one block.

21. The system of claim 15 wherein background filling of the first canvas and the second canvas is implemented using a push-pull algorithm.

* * * * *